Figure 1:
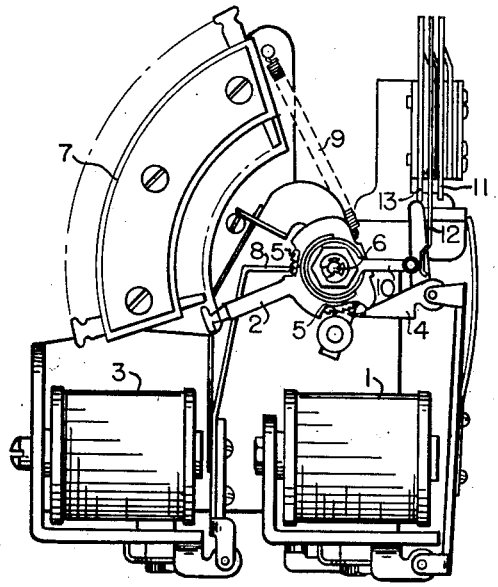

Nov. 27, 1951    M. E. GRIFFINS    2,576,220
AUTOMATIC SWITCH CONTROL CIRCUIT
Filed June 3, 1949

*INVENTOR.*
MORRIS E. GRIFFINS
BY
ATTORNEY

Patented Nov. 27, 1951

2,576,220

UNITED STATES PATENT OFFICE 2,576,220

AUTOMATIC SWITCH CONTROL CIRCUIT

Morris E. Griffins, Riverside, Ill., assignor to Automatic Electric Laboratories, Inc., Chicago, Ill., a corporation of Delaware Application June 3, 1949, Serial No. 96,997

6 Claims. (Cl. 175—320)

1

The present invention relates to selective signalling systems in general, but is more particularly concerned with a selective switch of the step-by-step type the function of which is to connect one wire with another particular wire selected by the mechanical action of the switch from a group of wires. This is accomplished by moving a spring contact or wiper to which the one wire has been connected into contact with one of certain stationary contacts to which the selected wire is connected. The stationary contacts are assembled in the form of a bank of contacts. Such a selective switch is the "Minor Switch" which is well known in the telephone art. The description of the invention is directed to the minor switch but it is to be understood that the invention is not limited to systems dealing exclusively with minor switches but is meant to cover selective systems dealing with similar selective switches.

The minor switch is operated from a normal position to the selected position in response to a series of impulses transmitted to the selective switch after seizure of the circuit associated with the selective switch. The wiper is moved to the selected position in response to a force applied to a ratchet wheel fixedly connected to the wiper assembly, the force being applied to the wiper assembly by a pawl operated by a stepping magnet. The switch remains in the selected position until the circuit is released, the switch then returning to its normal position in response to a second mechanical force applied to the wiper assembly. The force applied to restore the wiper to normal is opposite in direction to the force applied to move the wiper to the selected position in response to the impulses. If the two aforementioned forces should be applied to the selective switch at the same instance, each force tending to move the wiper assembly in the opposite directions, serious damage may result to the switch mechanism as well as a wrong selection.

An object of this invention is to provide a circuit means which will prevent the application of the force tending to move the wipers to a selected position during the period the force is being applied to move the wiper from a selected position to the normal position after release of the circuit.

A feature of this invention is the provision of a circuit to the release relay of the system taken thru the off-normal springs of the minor switch, operation of this release relay and thereby subsequent operation of the stepping magnet being prevented until the selective switch is in the normal position.

The invention will appear more clearly from the following detailed description when taken in connection with the accompanying drawings, showing by way of example, a preferred embodiment of the inventive idea.

Figure 2:
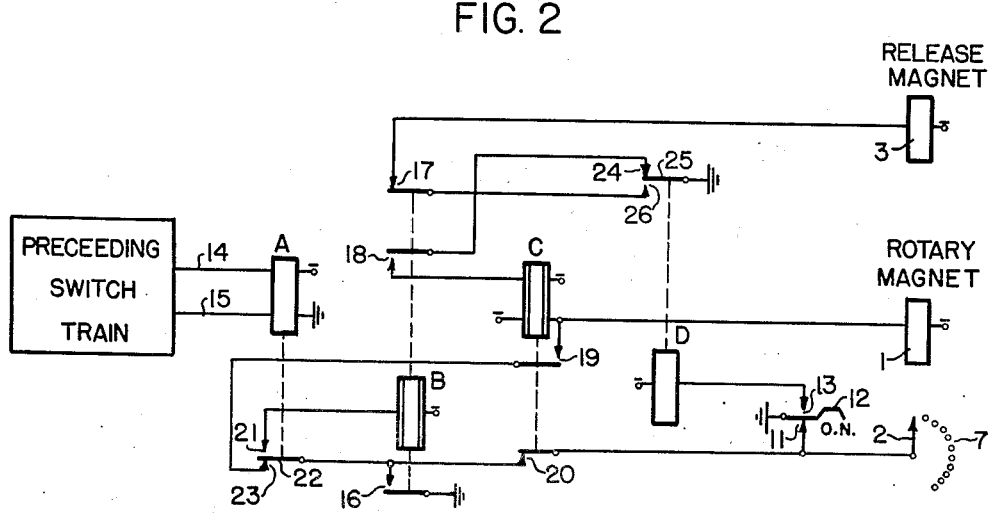

Figure 1 depicts the well known minor switch and Figure 2 shows a circuit arrangement for carrying out the invention.

Referring now to Figure 1, the minor switch

2 has a rotary or operating magnet 1 for rotating the wiper 2 step-by-step and a release magnet 3 for causing the wiper to return to the normal position, the position in which the switch is pictured in Figure 1. A pawl arm 4 is operated by the rotary magnet and engages the ratchet wheel 5 fixedly mounted on the bearing shaft 6 to which the wiper is also fixedly attached. The force applied to the ratchet wheel 5 by the pawl 4 causes the wheel 5 and thus the bearing shaft 6 and wiper 2 to rotate from the normal position to the first contact in the contact bank 7. The detent 8 engages the ratchet 5 and holds the wiper in this operated position when the rotary magnet 1 restores and disengages the pawl 4 from the ratchet 5. The wiper is stepped further by operation of the rotary magnet in a similar manner, the detent 8 holding the wiper in the furthest operated position off normal. A spiral spring 9 attached to the bearing shaft 6 and the wiper assembly is stretched during the rotary action thus storing energy which is used to return the wiper to the normal position when the detent 8 is removed from engagement with the ratchet 5. The detent 8 is controlled by the release magnet 3 which when operated disengages the detent 8 from the ratchet 5. When the wiper first steps from the normal position, the arm 10 which is fixedly mounted on the bearing shaft 6 causes the off-normal springs 11 and 12 to open and the off-normal springs 12 and 13 to close. The off-normal springs 12 and 13 remain closed until the wipers are returned to the normal position at which time arm 10 causes springs 12 and 13 to open and springs 11 and 12 to close. The object of this invention is to prevent the operation of the rotary magnet 1 and subsequent engagement of the pawl 4 and ratchet wheel 5 during the period of time when the release magnet is operated and the wiper is moving to the normal position to thus prevent "chewing up" the end of the pawl and the ratchet teeth.

Referring now to Figure 2, when the circuit embodied therein is seized over the lines 14 and 15 from the preceding switch train, the circuit is closed thru the two windings of relay A in series in a well known manner. Relay A operates and at contacts 21 and 22 closes the circuit by way of contacts 20 to slow-release relay B from ground thru the off-normal contacts 11 and 12. Relay B operates, closes a holding circuit to itself thru contacts 16, 21 and 22, opens a part of the circuit to the release magnet 3 at contacts 17, and closes the circuit to the upper winding of slow-release relay C thru contacts 18 to ground at contacts 24 and 25. Relay C operates, prepares a holding circuit to its lower winding at contacts 19, and opens the original operating circuit to relay B at contacts 20, relay B now being held by ground at contacts 16.

The switch is now conditioned to receive the selective signals or impulses sent over the lines 14 and 15 by operation of a telephone dial or impulse sender (not shown) in the preceding switch train. Relay A follows the impulses in a well known manner and, on the first release of relay A in response to the first impulse, opens the circuit to relay B at contacts 21 and 22 and closes the circuit from ground at contacts 16 to the lower winding of relay C and the rotary magnet 1 in parallel thru contacts 22, 23 and 19. Slow-release relay B will not release during the impulse release time of relay A. The rotary magnet 1 operates in response to the first impulse causing the wiper 2 to step from its normal position to the first contact on the bank of contacts 7. Relay A reoperates after the impulse, reclosing the circuit to relay B and opening the circuit to the lower winding of relay C and the rotary magnet 1. The rotary magnet 1 restores. On this first step of the wiper 2, the off-normal contact springs operate, opening contacts 11 and 12 and closing contacts 12 and 13, thus closing the circuit to relay D. Relay D operates, opens the circuit to the upper winding of relay C at contacts 24 and 25, and closes a part of the circuit to the release magnet 3 thru contacts 25 and 26. Relay C is a slow-to-release relay and will remain in the operated position for a short period after the circuit to either of its windings is opened. Assuming there is more than one impulse in the transmitted digit, relay A will restore in response to the second impulse received, again opening relay B and reclosing the lower winding of relay C and the rotary magnet 1 in parallel thru contacts 22 and 23. The rotary magnet 1 operates to step the wiper 2 of the minor switch to the second contact in the contact bank 7, and relay C is reenergized thru its lower winding so that it will remain operated. When relay A restores after the second impulse, the circuit to the lower winding of relay C and the rotary magnet 1 is opened and the circuit to relay B reclosed. The rotary magnet 1 restores. In this manner, relay A follows the impulses received over the lines 14 and 15 and causes the rotary magnet 1 to operate and release to step the wiper of the minor switch; relays B and C remaining operated during stepping.

After the last impulse has been received, relay A reoperates, opening the circuit to the rotary magnet 1 and the lower winding of relay C and closing the circuit to relay B. The rotary magnet 1 restores. Slow-release relay C restores a short interval later and opens the circuit to its lower winding and the rotary magnet 1 at contacts 19. Relay C on restoring also closes the ground at contacts 16 of relay B thru contacts 20 to the wiper 2 of the minor switch to thereby ground the selected contact for signalling or other purposes.

When this circuit is released, the line leads 14 and 15 are opened and relay A restores, opening the circuit at contacts 21 and 22 to relay B. Relay B restores and at contacts 16 removes the ground from the selected bank contact and at contacts 17 closes the circuit to the release magnet 3. The release magnet 3 operates from ground at contacts 25 and 26 by way of contacts 17 to restore the minor switch wiper 2 to normal. When the minor switch wiper reaches the normal position, the off-normal contacts 12 and 13 are opened and contacts 11 and 12 closed, the circuit to relay D thereby being opened. Relay D restores and opens the circuit to the release magnet 3 which restores. The circuit is now at normal and may be subsequently used for further selecting.

This circuit is designed so that the minor switch must be released before a new selection is made and so that the stepping magnet will not respond to impulses during the released period. Should the line circuit to relay A be closed during the period when the release magnet 3 is operated after relay B has restored, there would be no circuit available to operate relay B thru contacts 11 and 12 until the minor switch has returned to normal and the contacts 11 and 12 of the off-normal springs had closed. It follows that any impulses received during this release period would not cause the rotary magnet to operate to step the wipers.

What is desired to be protected by Letters Patent is set forth in the following claims:

What is claimed is:

1. In a signaling system including a selector switch having a normal position and provided with a stepping magnet for operating said selector switch away from its normal position and a release magnet for returning said selector switch to its normal position and an off-normal device operated when said selector switch occupies other than its normal position; the combination comprising a line relay operated in response to the seizure of said selector switch and restored in response to the release of said selector switch, said line relay also being intermittently restored and reoperated in response to signal impulses, a release relay of the slow-to-release type, an operating circuit for said release relay including a front contact of said line relay and a back contact of said off-normal device, a holding circuit for said release relay including a front contact of said line relay and a front contact of said release relay, an operating circuit for said stepping magnet including a back contact of said line relay and a front contact of said release relay, and an operating circuit for said release magnet including a back contact for said release relay.

2. In a signaling system including a selector switch having a normal position and provided with a stepping magnet for operating said selector switch away from its normal position and a release magnet for returning said selector switch to its normal position and an off-normal device operated when said selector switch occupies other than its normal position; the combination comprising a line relay operated in response to the seizure of said selector switch and restored in response to the release of said selector switch, said line relay also being intermittently restored and reoperated in response to signal impulses, a release relay of the slow-to-release type, an operating circuit for said release relay including a front contact of said line relay and a back contact of said off-normal device, a holding circuit for said release relay including a front contact of said line relay and a front contact of said release relay, an operating circuit for said stepping magnet including a back contact of said line relay and a front contact of said release relay, an off-normal relay, an operating circuit for said off-normal relay including a front contact of said off-normal device, and an operating circuit for said release magnet including a back contact of said release relay and a front contact of said off-normal relay.

3. In a signaling system including a selector switch having a normal position and provided with a stepping magnet for operating said selector switch away from its normal position and a release magnet for returning said selector switch to its normal position and an off-normal device operated when said selector switch occupies other than its normal position; the combination comprising a line relay operated in response to the seizure of said selector switch and restored in response to the release of said selector switch, said line relay also being intermittently restored and reoperated in response to signal impulses, a release relay of the slow-to-release type, an operating circuit for said release relay including a front contact of said line relay and a back contact of said off-normal device, a holding circuit for said release relay including a front contact of said line relay and a front contact of said release relay, a hold relay of the slow-to-release type, an off-normal relay, an operating circuit for said hold relay including a front contact of said release relay and a back contact of said off-normal relay, a holding circuit for said hold relay including a back contact of said line relay and a front contact of said release relay and a front contact of said hold relay, an operating circuit for said stepping magnet including a back contact of said line relay and a front contact of said release relay and a front contact of said hold relay, an operating circuit for said off-normal relay including a front contact of said off-normal device, a signal circuit to said selector switch including a front contact of said release relay and a back contact of said hold relay, and an operating circuit for said release magnet including a back contact of said release relay and a front contact of said off-normal relay.

4. In a signaling system including a selector switch provided with a contact bank, a wiper cooperating with said contact bank and having a normal position, a spring biasing said wiper into its normal poistion, a stepping magnet operative to operate said wiper from its normal position against the bias of said spring step-by-step in a given direction to select any one of the contacts in said contact bank, a detent normally holding said wiper in its operated position, a release magnet operative to release said detent so that said spring returns said wiper in the opposite direction back into its normal position, and an off-normal device operatively associated with said wiper; the combintaion comprising a line relay operated in response to the seizure of said selector switch and restored in response to the release of said selector switch, said line relay also being intermittently restored and reoperated in response to signal impulses, a release relay of the slow-to-release type, an operating circuit for said release relay including a front contact of said line relay and a back contact of said off-normal device, a holding circuit for said release relay including a front contact of said line relay and a front contact of said release relay, an operating circuit for said stepping magnet including a back contact of said line relay and a front contact of said release relay, and an operating circuit for said release magnet including a back contact of said release relay.

5. In a signaling system including a selector switch having a normal position and provided with a stepping magnet for operating said selector switch away from its normal position and a release magnet for returning said selector switch to its normal position and an off-normal device operated when said selector switch occupies other than its normal position; the combination comprising a line extending to said selector switch, a line relay, said line relay being operated in response to seizure of said line, a release relay of the slow-to-release type, means responsive to operation of said line relay for completing an operating circuit for said release relay including a front contact of said line relay and a back contact of said off-normal device, means responsive to operation of said release relay for completing a holding circuit therefor including said front contact of said line relay, said line relay being restored and reoperated in response to each signal impulse on said line, means responsive to restoration and reoperation of said line relay for completing and interrupting an operating circuit for said stepping magnet including a back contact of said line relay and a front contact of said release relay, said release relay remaining operated during restoration of said line relay in following a signal impulse, said off-normal device being operated to open said back contact thereof in response to operation of said selector switch from its normal position, said line relay being restored in response to release of said line, said release relay being restored a short time interval following restoration of said line relay, means responsive to restoration of said release relay for completing an operating circuit for said release magnet including a back contact of said release relay, said off-normal device being operated to close said back contact thereof in response to return of said selector switch to its normal position, and additional means responsive to operation of said off-normal device in response to return of said selector switch to its normal position for interrupting said operating circuit for said release magnet.

6. In a signaling system including a selector switch having a normal position and provided with a stepping magnet for operating said selector switch away from its normal position and a release magnet for returning said selector switch to its normal position and an off-normal device operated when said selector switch occupies other than its normal position; the combination comprising a line relay operated in response to the seizure of said selector switch and restored in response to the release of said selector switch, said line-relay also being intermittently restored and reoperated in response to signal impulses, a release relay of the slow-to-release type, an operating circuit for said release relay including a front contact of said line relay and a back contact of said off-normal device, means responsive to operation of said release relay for completing a holding circuit therefor including said front contact of said line relay and excluding said back contact of said off-normal device, an operating circuit for said stepping magnet including a back contact of said line relay and a front contact of said release relay, and an operating circuit for said release magnet including a back contact of said release relay.

MORRIS E. GRIFFINS.

REFERENCES CITED

The following references are of record in the file of this patent:

UNITED STATES PATENTS

| Number | Name | Date |
| --- | --- | --- |
| 1,520,821 | Kaisling | Dec. 20, 1924 |
| 2,348,301 | Lomax | May 9, 1944 |
| 2,446,943 | McGoffin | Aug. 10, 1948 |
| 2,478,361 | Bartelink | Aug. 9, 1949 |